(12) United States Patent
Kastner

(10) Patent No.: US 11,433,578 B2
(45) Date of Patent: Sep. 6, 2022

(54) MIXING DEVICE FOR PRODUCING A PLASTIC MELT LOADED WITH A PROPELLANT

(71) Applicant: ENGEL AUSTRIA GmbH, Schwertberg (AT)

(72) Inventor: Clemens Kastner, Linz (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 6 days.

(21) Appl. No.: 16/393,385

(22) Filed: Apr. 24, 2019

(65) Prior Publication Data
US 2019/0329463 A1    Oct. 31, 2019

(30) Foreign Application Priority Data

Apr. 25, 2018 (AT) .............................. A 50348/2018

(51) Int. Cl.
*B29C 44/34* (2006.01)
*B29C 44/60* (2006.01)

(52) U.S. Cl.
CPC .......... *B29C 44/3449* (2013.01); *B29C 44/60* (2013.01); *B29C 44/3446* (2013.01)

(58) Field of Classification Search
CPC . B29C 44/60; B29C 44/3449; B29C 44/3446; B29C 44/34; B29C 44/3453; B29C 44/3457; B29C 44/3442
USPC ............................................. 425/4 R, 817 R
See application file for complete search history.

(56) References Cited

U.S. PATENT DOCUMENTS

| | | | | |
|---|---|---|---|---|
| 3,697,204 A * | 10/1972 | Kyritsis | ............... | B29C 44/424 425/4 R |
| 4,043,715 A * | 8/1977 | Hendry | ............... | B29C 44/3442 264/DIG. 83 |
| 4,181,647 A * | 1/1980 | Beach | ....................... | B29B 7/88 264/45.9 |
| 4,211,523 A * | 7/1980 | Hunerberg | .......... | B29C 44/3446 261/45 |
| 4,255,367 A * | 3/1981 | Wallace | ............. | B29C 45/1816 264/45.1 |
| 4,344,710 A * | 8/1982 | Johnson | ............. | B29C 44/3442 264/53 |

(Continued)

FOREIGN PATENT DOCUMENTS

| | | |
|---|---|---|
| DE | 100 55 022 | 5/2002 |
| DE | 198 53 021 | 2/2006 |
| DE | 10 2005 020 794 | 11/2006 |

OTHER PUBLICATIONS

Search Report dated Jan. 8, 2019 in Austian Application No. A 50348/2018, with English translation.

*Primary Examiner* — Seyed Masoud Malekzadeh
(74) *Attorney, Agent, or Firm* — Wenderoth, Lind & Ponack, L.L.P.

(57) ABSTRACT

A mixing device for producing a plastic melt loaded with propellant, from which a foamed plastic part is producible in a molding machine, includes a mixing chamber, at least one propellant inlet device for feeding propellant into the mixing chamber, an inlet channel for plastic melt, and an output channel for dispensing plastic melt loaded with propellant. A first gas-tight shutoff device is provided for closing the inlet channel, and a second gas-tight shutoff device is provided for closing the output channel.

19 Claims, 5 Drawing Sheets

(56) References Cited

U.S. PATENT DOCUMENTS

| | | | | |
|---|---|---|---|---|
| 4,389,358 A * | 6/1983 | Hendry | B29C 45/1615 | 264/DIG. 83 |
| 4,390,332 A * | 6/1983 | Hendry | B29C 45/03 | 264/DIG. 83 |
| 5,098,267 A * | 3/1992 | Cheng | B29C 44/3449 | 366/76.9 |
| 5,874,031 A * | 2/1999 | Okuda | B01F 3/04446 | 264/176.1 |
| 6,322,347 B1 * | 11/2001 | Xu | B29C 48/388 | 264/211 |
| 6,435,853 B1 * | 8/2002 | Teraoka | B29C 44/3446 | 425/208 |
| 6,884,823 B1 * | 4/2005 | Pierick | B29C 48/74 | 521/142 |
| 7,097,438 B2 * | 8/2006 | Schuermann | B29C 44/0492 | 264/50 |
| 7,144,532 B2 * | 12/2006 | Kim | B29C 44/3446 | 264/40.1 |
| 7,318,713 B2 * | 1/2008 | Xu | B29C 48/51 | 425/4 R |
| 7,943,672 B2 * | 5/2011 | Kamiyama | B29C 44/3446 | 516/10 |
| 10,471,630 B2 * | 11/2019 | Baeck | B29B 13/022 | |
| 10,525,625 B2 * | 1/2020 | Dirneder | B29C 45/74 | |
| 2004/0009250 A1 * | 1/2004 | Schuermann | B29C 44/0492 | 425/4 R |
| 2004/0080065 A1 * | 4/2004 | Kim | B29C 48/92 | 264/40.1 |
| 2005/0017412 A1 * | 1/2005 | Maier | B29C 48/67 | 425/207 |
| 2014/0091489 A1 * | 4/2014 | Kim | B29C 44/3446 | 264/50 |
| 2015/0038605 A1 * | 2/2015 | Baghdadi | C08J 9/122 | 521/137 |
| 2015/0038606 A1 * | 2/2015 | Baghdadi | B29C 44/3446 | 521/137 |
| 2015/0038607 A1 * | 2/2015 | Baghdadi | C08J 9/122 | 521/137 |
| 2015/0336307 A1 * | 11/2015 | Yamamoto | B29C 45/63 | 264/40.4 |

* cited by examiner

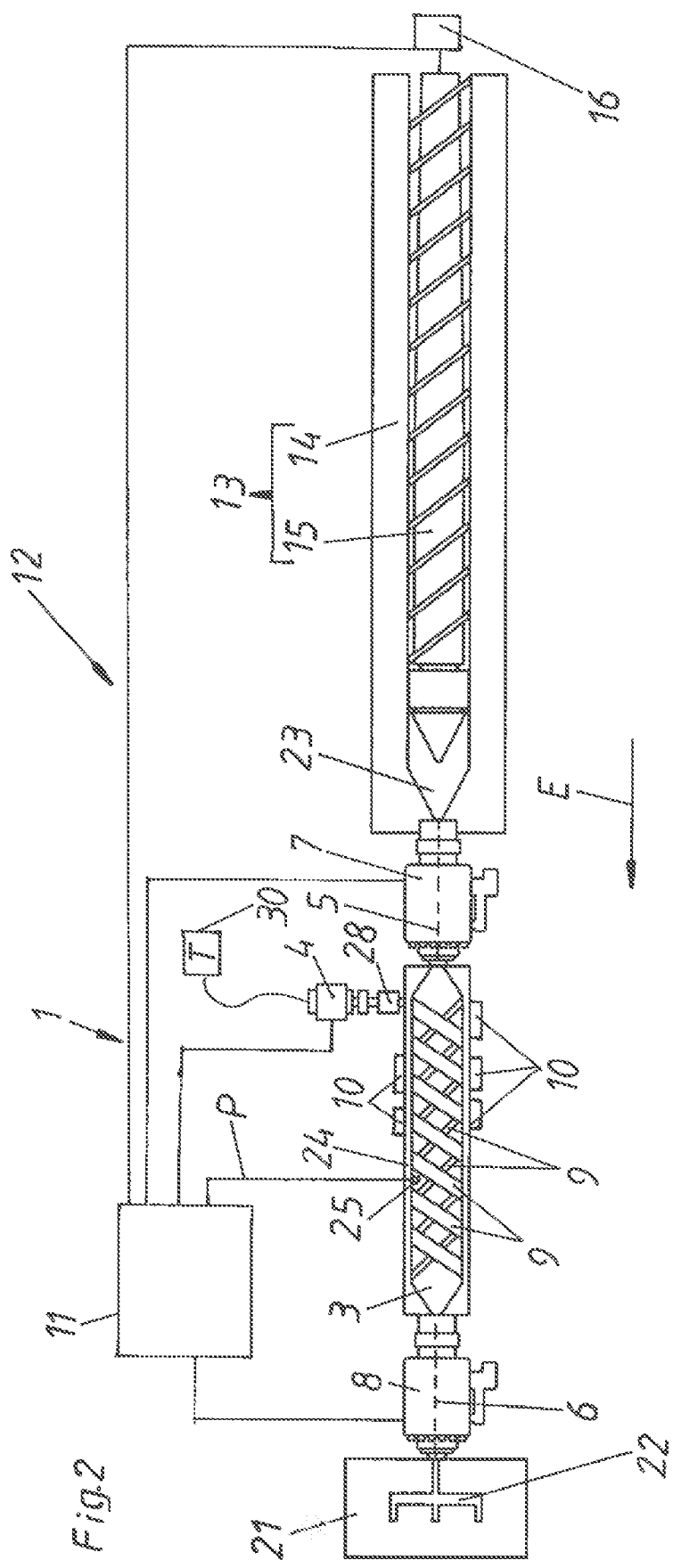

MIXING DEVICE FOR PRODUCING A PLASTIC MELT LOADED WITH A PROPELLANT

BACKGROUND OF THE INVENTION

The invention concerns a mixing device for producing a plastic melt containing a propellant, from which a foamed plastic part is producible in a molding machine, in particular an injection molding machine, comprising a mixing chamber, at least one propellant inlet device for feeding propellant into the mixing chamber, an inlet channel for plastic melt, and an outlet channel for dispensing plastic melt loaded with propellant. The invention also concerns an injection device with such a mixing device. In addition, the invention concerns a molding machine with such a mixing device or with such an injection device.

Plastic melts loaded with propellants, especially gas-laden melts, have been used for many decades to produce foamed molding parts in respective molding machines. The resulting molding parts mostly show a consistency, which is flexible to a certain degree. Such molded parts are used, for example, as relatively soft covers in vehicle interiors or the like.

An example of a device for producing such foamed plastic moldings is described in DE 198 53 021 B4. It describes a screw piston machine with a plasticizing aggregate for plasticizing a polymer and an injection nozzle. Between the injection nozzle and the plasticizing aggregate, a melt channel arranged in a cylinder, a torpedo insert arranged in the melt channel with a porous outer shell, and a hollow cylinder made of sinter metal are provided. Via the porous surfaces of the hollow cylinder, a physical propellant is insertable. Disadvantageous with this device is that a relatively low pressure can be built up in the mixer. As a result, relatively little propellant dissolves. In addition, the propellant dissolves relatively slowly.

The US 2014/0091489 A1 shows a screw arranged in a cylinder, whereby a static mixing device is arranged adjacent to this screw. This mixing device is limited from both sides by a valve. A propellant can be fed into the static mixer from a source via a propellant inlet system. In this U.S. publication, a propellant is fed from a source not specified in more detail via a propellant inlet system. It merely counteracts the foaming pressure of the polymer-gas mixture.

The object of the present invention is therefore to create an improved mixing device with respect to the prior art. In particular, the stated disadvantages are to be overcome.

SUMMARY OF THE INVENTION

According to the invention, a first gas-tight shutoff device is provided through which the inlet channel is closable, and a second gas-tight shutoff device through which the output channel is closable. Because these shutoff devices are arranged on both sides of the mixing chamber, it is possible that a very high pressure can be built up in the mixing chamber. The high pressure causes the propellant to dissolve more, and, more importantly, more quickly. At the same time, plastic can be plasticized or metered again in an upstream plasticizing aggregate. The mixing device achieves a mixture of propellant and plastic melt that is as homogeneous as possible. In the above-mentioned US 2014/0091489 A1, only the not further defined valves or shut-off nozzles are described. In particular, at high pressures prevailing in the mixing chamber, only gas-tight shutoff devices can guarantee that the propellant is mixed efficiently and homogeneously with the plastic melt. The gas tightness prevents gas loss during the transition of the gas into the dissolved state, and therefore enhances the accuracy of the process.

The shutoff devices are adjustable in such a way that the pressure in the mixing chamber is kept above a defined, critical value. This ensures a sufficient dissolution of the propellant in the plastic melt.

Preferably, the propellant inlet device has a piston mechanism for (forced) high-pressure injection. In systems known so far, it is merely counteracted to the foaming pressure of the polymer-gas mixture. This foaming pressure is normally approx. 30 to 40 bar. In contrast, gas-tight shutoff devices can enclose a high pressure applied by the screw in the mixing chamber (up to 1,400 bar, depending on the device used). With a piston mechanism, the gas can be fed in even at very high pressures prevailing or being enclosed in the plasticizing cylinder. The combination of gas-tight shutoff devices and piston injector thus guarantees constant pressure actuation, which is beneficial to the quality of the molding to be produced. This causes the gas-laden melt to be enclosed under this high pressure. It is advantageous that the propellant dosage is thus not dependent on the pressure change in the mixing chamber. Exact metering is possible due to the forced gas loading. Overall, this also results in better dissolution behavior, a higher dissolution velocity, generally improved gas absorption (more gas is dissolved, which may be desirable especially in case of high intended density reductions), and a favorable ratio between surface and volume of the propellant-melt mixture.

At present, comparable systems use throttle elements to control the injected gas masses. The gas quantity is thereby controlled via the pressure difference acting to the throttle element (if the pressure difference is known, the gas mass flow is also known with a given throttle element). The regulation and control of this pressure difference is sometimes difficult as the pressure after the throttle element is not always constant, and the pressure upstream the element therefore constantly has to be adjusted. In addition, a conversion to another throttle element may be necessary for different required gas mass flows, as they are only designed for certain mass flow ranges. In contrast to this, a simpler and more reproducible concept for gas injection is given with the present "forced gas injection".

The first gas-tight shutoff device can also be described as a cylinder-sided shutoff device. This first gas-tight shutoff device is intended to prevent the propellant from escaping in the direction of the screw vestibule of a plasticizing aggregate. In particular, gas loss via the funnel of the plasticizing aggregate is prevented. It is also prevented that a "gas lake" is formed.

It is basically possible to use a dynamic mixer in the mixing chamber. Such a dynamic mixer has movable mixing elements, which are moved by an additionally necessary drive. For a less elaborate design, it is preferably provided that the mixing chamber comprises a static mixer, wherein the static mixer is formed by a plurality of stationary mixing elements attached to a wall of the mixing chamber. Such stationary mixing elements can be designed, for example, in the form of sheet metal inlays. These mixing elements ensure a defined mixing of the fed-in plastic melt with the propellant.

For the mixing chamber, it preferably can take up several shot volumes, so that the mixture in the mixing chamber (preferably a polymer-gas mixture) spends sufficient time in the mixing chamber in order to ensure the dissolution of the propellant.

In addition, preferably a temperature control device is provided for the mixing chamber, which at least partially surrounds the mixing chamber. In particular, the mixing chamber is heated via the temperature control device in order to prevent the mixture in the mixing chamber from freezing or solidifying.

According to a preferred embodiment, the propellant is a gas, preferably nitrogen. Of course, it is also possible to feed in other suitable propellants or mixtures of different propellants via the at least one propellant inlet device.

For example, polypropylene, polyethylene (PE), polyvinyl chloride (PVC), polystyrene (PS), etc. or mixtures thereof can be fed in as a plastic melt. In the automotive industry, polypropylene (PP) is the most important material for foam injection molding applications.

Each plastic or plastic melt can contain filler materials (e.g. glass fibers, carbon fibers, talcum, etc.) or be designed as a compound (e.g. with a rubber phase).

According to another preferred embodiment, the mixing device has a control or regulating unit for controlling or regulating the mixing device. This control or regulating unit can be designed completely independently, or can also be part of a (superordinate) machine control for the entire molding machine.

For simple functionality, preferably the first shutoff device and/or the second shutoff device are/is switchable between a closed position and an open position by the control or regulating unit, preferably depending on a pressure measured in the mixing chamber. The pressure in the mixing chamber can be detected by at least one corresponding sensor.

In addition or alternatively, it is also possible that the propellant inlet device is controllable by the control or regulating unit.

An injection device for a molding machine with a mixing device according to the invention is also provided.

According to a preferred embodiment of the injection device, it has a plasticizing aggregate for melting a plastic starting product, in particular in granular form, into the plastic melt, and for conveying the plastic melt in the direction of injection into the inlet channel of the mixing device. Thus, this plasticizing aggregate is arranged upstream of the mixing device in the injection direction. In other words, the mixing device is located between the plasticizing aggregate and a molding tool of the molding machine. It is preferably provided that the plasticizing aggregate comprises a plasticizing cylinder, a rotatable plasticizing screw, and a drive device for the plasticizing screw. In order to be able to also carry out injection, preferably the plasticizing screw is linearly displaceable in the direction of injection (in axial direction).

In addition, a molding machine, in particular an injection molding machine, an injection press or a press, produces a foamed plastic part, with a mixing device according to the invention or an injection device mentioned above.

Alongside the injection device, this molding machine also has a clamping unit, wherein the clamping unit has a fixed mold mounting plate, a movable mold mounting plate, a drive device for the movable mold mounting plate, and a molding tool clamped to the mold mounting plates.

For the second gas-tight shutoff device, it is generally stated that the latter can also be described as a tool-sided shutoff device. Particularly when using a hot runner in the area of the molding tool, it may be provided that the second gas-tight shutoff device is formed by a shut-off nozzle of the molding tool. Here, also several shut-off nozzles for the respective hot runner can altogether form the second gas-tight shutoff device.

For operating an injection device with a mixing device according to the invention, there are two preferred variants. In the first process sequence, the propellant is loaded during metering, the material in the mixing chamber remains static. In the second process sequence, the propellant is loaded during injection, and the material in the mixing chamber is in motion.

In the first process sequence, after the propellant-plastic mixture has been injected into the cavity of the molding tool in the previous cycle, the second shutoff device (mold-sided shut-off nozzle or nozzles) is closed as a first step. Then the plastic melt in the mixing chamber is adjusted to a certain pressure value. The pressure setting depends on the previously acting injection pressure. If this injection pressure is very low, pressure can be built up after injection, as the dissolving behavior is favored under higher pressures. However, if the injection pressure is already relatively high, the pressure in the mixing chamber is reduced so that the propellant (gas) cannot escape from the solvent. During the entire time that the propellant spends in the mixing chamber, the solubility limit should not be undercut. This limit is linearly related to the pressure in the mixing chamber. This means that the pressure should therefore be high enough. Basically, the final pressure level can be selected freely.

Next, the first shutoff device (on the cylinder side) is closed. As a result, the pre-stressed plastic melt is enclosed in the mixing chamber. While metering is carried out in the upstream plasticizing aggregate, the propellant is fed into the mixing chamber via the propellant inlet device. Thereby the pressure conditions are relatively easy to measure, which also makes the metering of the propellant easier than when injecting into the cylinder while the plasticizing screw is rotating. The propellant can therefore be fed in by regulating the pressure drop accordingly. Alternatively, it is also possible to use a piston injector instead of a pressure-controlled injection device. The main advantage is therefore the simple method of pressure measurement for propellant injection, as the plastic melt is at rest and decoupled from the plasticizing aggregate.

After metering, the pressure in the screw vestibule can first—if necessary—be adjusted to the pressure in the mixing chamber. The first shutoff device (on the cylinder side) is then opened. Injection is then carried out. Thereby the propellant-melt mixture (polymer-gas-mixture) is pressed through the mixing chamber. Thereby the gas phase is also dispersed in order to ensure good conditions for the solvent. It is to be noted with this first process sequence that after the propellant injection, this propellant is present in the form of a large bubble. The length of the mixing chamber must be sufficient to take up the necessary propellant. Good mixing performance should be ensured by the design of the mixing elements. The advantages of this first process sequence lie in the simple and very precise metering of the propellant. In particular, the pressure in the pre-stressed plastic melt in the mixing chamber is precisely known. The increase in pressure due to the injection of the propellant is well measurable. Difficulties, such as fluctuating pressure conditions in the mixing cylinder due to the rotation of a screw, are eliminated. The pressures for metering the propellant can be kept to a minimum. This means that the melt can be pre-stressed to the relatively low pressure value at which no propellant emerges from the solvent.

In the second process sequence, the propellant is injected during the injection process. The propellant injection pressure should thereby be higher than the injection pressure. There is no regulation over the pressure changes, but a "forced" high pressure injection takes place over a piston mechanism. The mixing already takes place during the propellant injection. The propellant injection pressure time should be adjusted to the injection duration. This results in a continuous propellant loading in the mixing chamber. There is no unloaded phase. The sequence is again in such a way that the second (tool-sided) shutoff device is closed after an injection process. Thereafter, the pressure of the propellant in the propellant inlet device is reduced so that the propellant (in particular the gas) cannot escape from the solvent. (At very low injection pressures, a pressure build-up could also take place.) Then the first (cylinder-sided) shutoff device is closed. As a result, there is a pre-stressed plastic melt in the mixing chamber. The metering in the upstream plasticizing aggregate takes place decoupled. The propellant fed in via the propellant inlet device "stands still" in the mixing chamber.

After metering, the pressure in the screw vestibule of the plasticizing aggregate is first adjusted to the pressure in the mixing chamber if necessary. Then, the first (cylinder-sided) shutoff device is opened. The injection itself takes place as with any conventional foam injection molding process. This means that the tool-sided shutoff device is usually opened fractions of a second (e.g. 0.2 sec) before the injection process, and then the plastic melt is pressed into the cavity.

The advantages of this second process are that the propellant dosage does not depend on the pressure change in the mixing chamber. This allows very precise metering (forced gas loading). The gas quantity can be checked in a separate cylinder at comparatively low pressures (e.g. 20 bar). The gas is already mixed in during the propellant injection. This results in a better dissolution behavior than in the first process sequence, since a certain dispersion is already given during the first rest phase. This results in a more favorable ratio between surface and volume of the propellant-melt mixture.

With a gas loading of up to 4% by weight at a temperature of approx. 200° C. and a pressure of approx. 20 bar, a holding capacity of less than 1 liter is required for the propellant to be fed in.

BRIEF DESCRIPTION OF THE DRAWINGS

Further details and advantages of the present invention will be explained in more detail below based on the figure description with reference to the embodiments shown in the drawings, in which:

FIG. 2 schematically shows a part of a plasticizing aggregate and the mixing device.

DETAILED DESCRIPTION OF THE INVENTION

Figure 1:
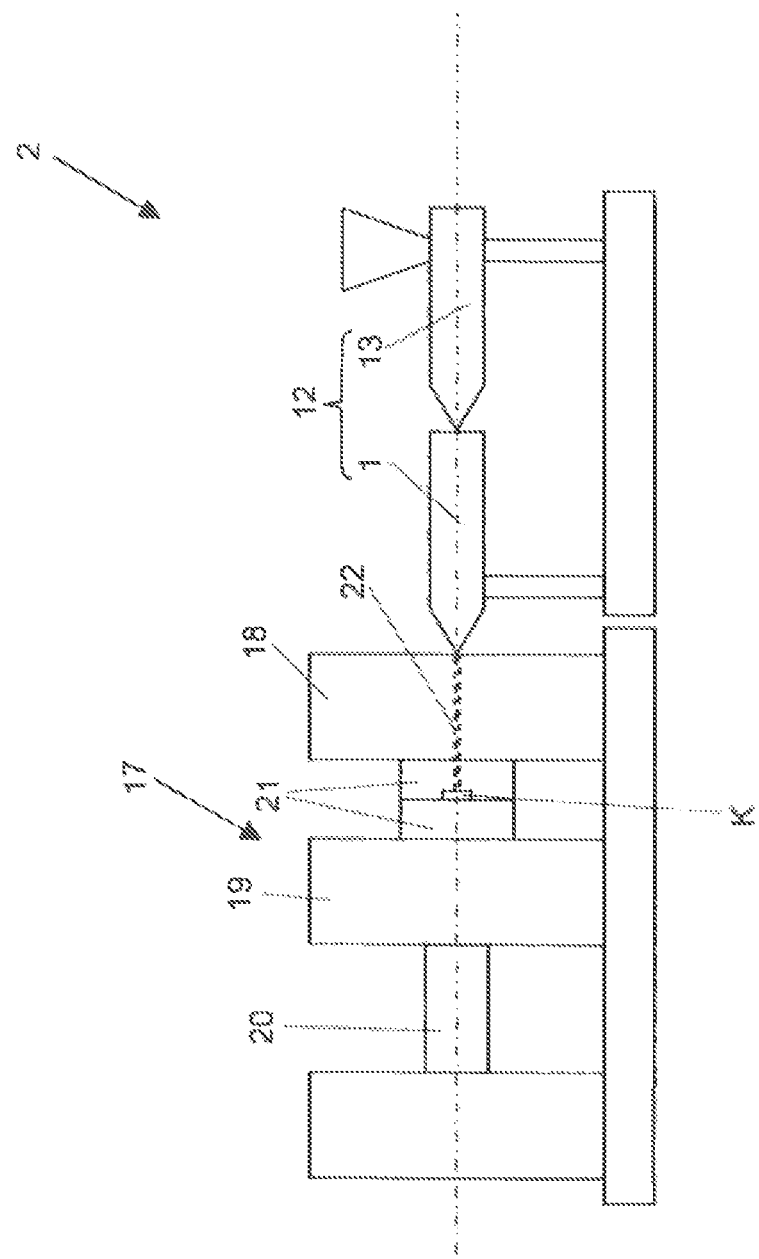
FIG. 1 schematically shows a molding machine.

FIG. 1 schematically shows a molding machine 2. In the left area the clamping unit 17 is visible, which has a movable mold mounting plate 19 and a fixed mold mounting plate 18. The movable mold mounting plate 19 is drivable via a drive device 20. This drive device 20 can, for example, be designed in the form of a toggle lever mechanism or a spindle drive. The molding tool 21 is mounted on the mold mounting plates 18, 19. When closed, at least one cavity K is formed in the molding tool 21. At least one injection channel 22 leads into this cavity K. In the right area of FIG. 1 an injection device 12 is schematically shown. This injection device 12 has a plasticizing aggregate 13 and the mixing device 1. Plastic melt is injected into the cavity K by the plasticizing aggregate 13 via the mixing device 1 and the injection channel 22. After the injected plastic melt has solidified, the molding tool 21 is opened, and the resulting molding part is ejected.

FIG. 2 shows a part of the injection device 12 with several details. In the right area, a part of a plasticizing aggregate 13 is shown. This plasticizing aggregate 13 consists of the plasticizing cylinder 14 and the plasticizing screw 15. The plasticizing screw 15 is driven by a schematically shown drive device 16 (e.g. an electric motor). In front of the plasticizing screw 14 there is the screw vestibule 23.

The mixing device 1 is shown on the left. This mixing device 1 has the mixing chamber 3. This mixing chamber 3 is formed in a mixing cylinder 24. A plurality of mixing elements 9 are attached to the wall of the mixing cylinder 24. These mixing elements 9 form a so-called static mixer. Between the mixing chamber 3 and the plasticizing aggregate 13, the mixing device 1 has the first gas-tight shutoff device 7. This first shutoff device 7 makes it possible to shut off the inlet channel 5 shown in dotted lines, which connects the plasticizing aggregate 13 with the mixing chamber 3. With the first shutoff device 7, the inlet channel 5 is switchable between an open position and a closed position. After the mixing chamber 3, the mixing device 1 has the second gas-tight shutoff device 8. This second shutoff device 8 is arranged in injection direction E after the mixing chamber 3, and in front of the schematically shown molding tool 21. In this molding tool 21, injection channel 22 is shown schematically in form of several hot runners. The output channel 6 is closable by the second shutoff device 8. This output channel 6 connects the mixing chamber 3 with the injection channel 22. The output channel 6 is switchable between an open position and a closed position by the second shutoff device 8. The first shutoff device 7 and the second shutoff device 8 can be designed different from each other or—as shown—identical to each other.

The mixing device 1 also has a propellant inlet device 4. This propellant inlet device 4 is connected to the mixing chamber 3 via an appropriate shut-off valve 28. The propellant inlet device 4 is supplied with propellant T via a propellant source 30. Nitrogen is preferably used as propellant T.

The mixing chamber 3 can be tempered via a temperature control device 10. This temperature control device 10 can (as schematically shown) be designed in the form of heating bands, which are arranged around the mixing cylinder 24. However, the temperature control device 10 can also have at least one tempering conduct in the mixing cylinder 24.

In the mixing chamber 3, a sensor 25 can also be arranged to measure the pressure P in the mixing chamber 3. This sensor 25 is in a signal connection with the schematically shown control or regulating unit 11. This control or regulating unit 11 can operate the two shutoff devices 7, 8 via corresponding signals. The propellant inlet device 4 can also be controlled via this control or regulating unit 11. It is also quite possible that the drive device 16 of the plasticizing screw 15 is controlled or regulated via this control or regulating unit 11.

Figure 3:
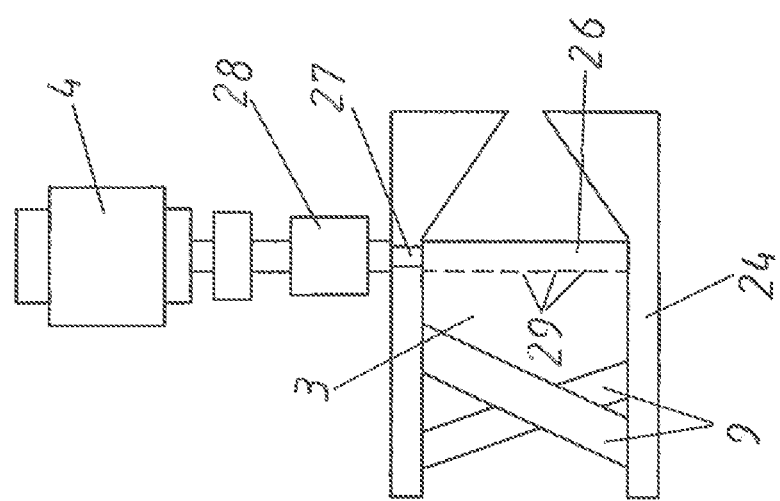
FIG. 3 shows the region of the propellant inlet device of the mixing device.

FIG. 3 shows the area of the propellant inlet device 4 of the mixing device 1 in more detail. This propellant inlet device 4 has an injection mandrel 26, which is connected to the other components of the inlet device 4 via an inlet channel 27 formed in the mixing cylinder 24. In particular, this inlet device 4 can also have a schematically shown, switchable inlet valve 28. The inlet mandrel 26 is arranged in the mixing chamber 3. The inlet mandrel 26, preferably tubular, has a plurality of inlet holes 29. These inlet holes 29 point in injection direction E. Via these inlet holes 29 the propellant T is fed into the plastic melt in mixing chamber 3. This regular arrangement of the plurality of inlet holes 29 ensures homogenous dispersion of the propellant T in the plastic melt.

Figure 4:
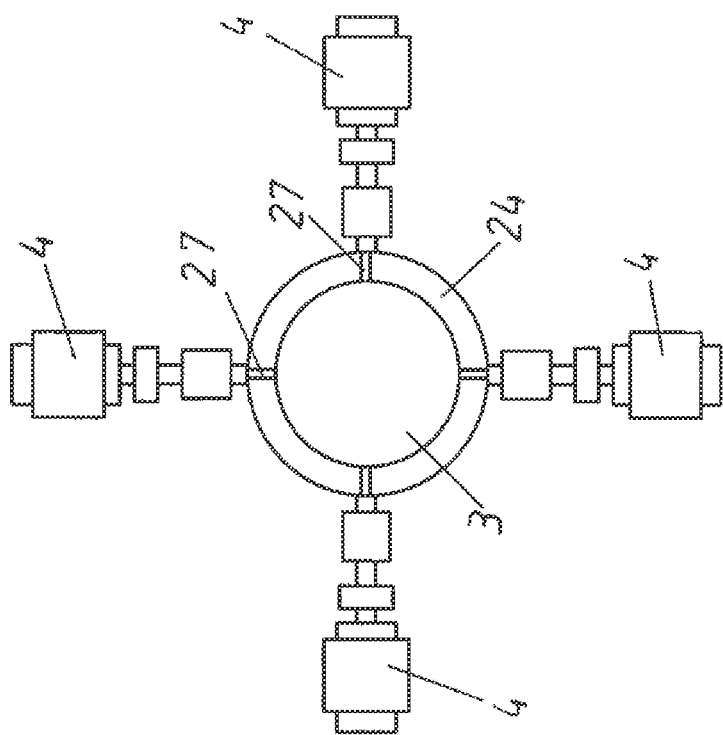
FIG. 4 shows several propellant inlet devices arranged around the mixing chamber.

In general, it is sufficient if a single propellant inlet device 4 is provided. However, in order to achieve a better dispersion, it is also possible—as shown in FIG. 4—to provide several propellant inlet devices 4, each of which is connected to the mixing chamber 3 via an inlet channel 27. In the case shown, the four propellant inlet devices 4 are arranged at constant distances from each other around the mixing chamber 3.

Figure 5:
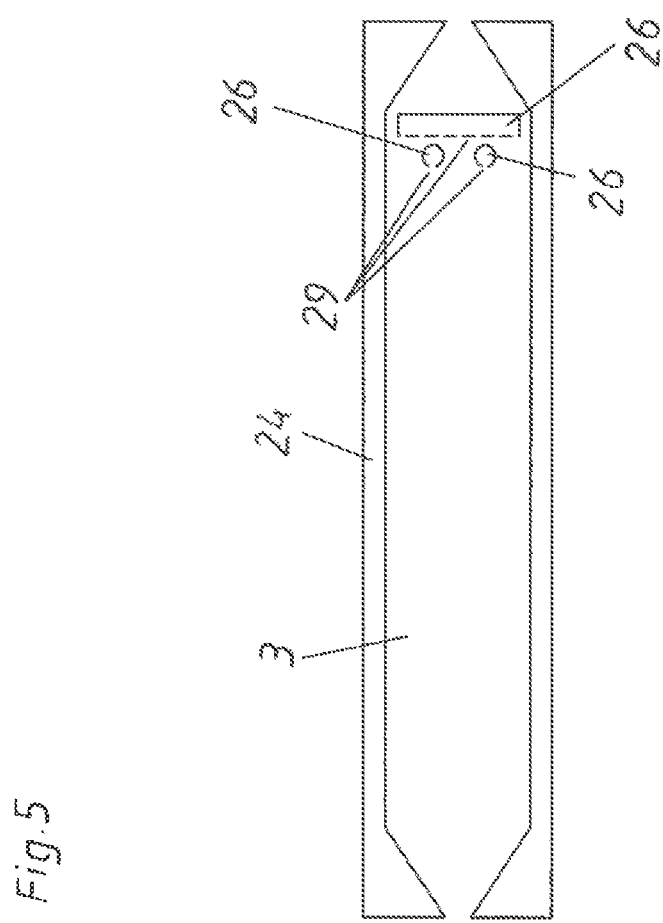
FIG. 5 is a schematic longitudinal section view through a mixing chamber with several mandrels of a propellant inlet device.

According to FIG. 5, another variant of the propellant inlet device 4 is shown. Hereby several inlet mandrels 26 are arranged in the mixing chamber 3. Each of these inlet mandrels 26 again has a plurality of inlet holes 29.

Figure 6:
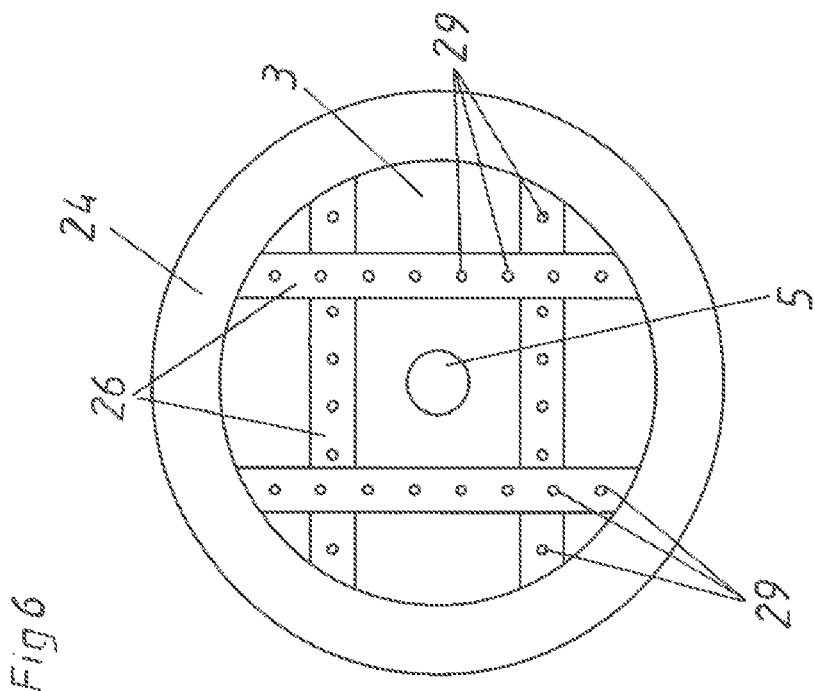
FIG. 6 is a suitable cross-section view to FIG. 5, and FIG. 7 schematically shows a part of a plasticizing aggregate and the mixing device with a propellant inlet device in the form of a piston injector.

FIG. 6 shows a corresponding cross-section through the mixing chamber 3. It can be seen that a total of four inlet mandrels 26 are arranged in the mixing chamber 3. Two inlet mandrels 26 run horizontally, while the other two run vertically. These inlet mandrels 26 can be connected to a single propellant inlet device 4, or they can be connected to one propellant inlet device 4 each, as shown in FIG. 4. This results in a homogeneous gas feed into the entire mixing chamber 3.

Figure 7:
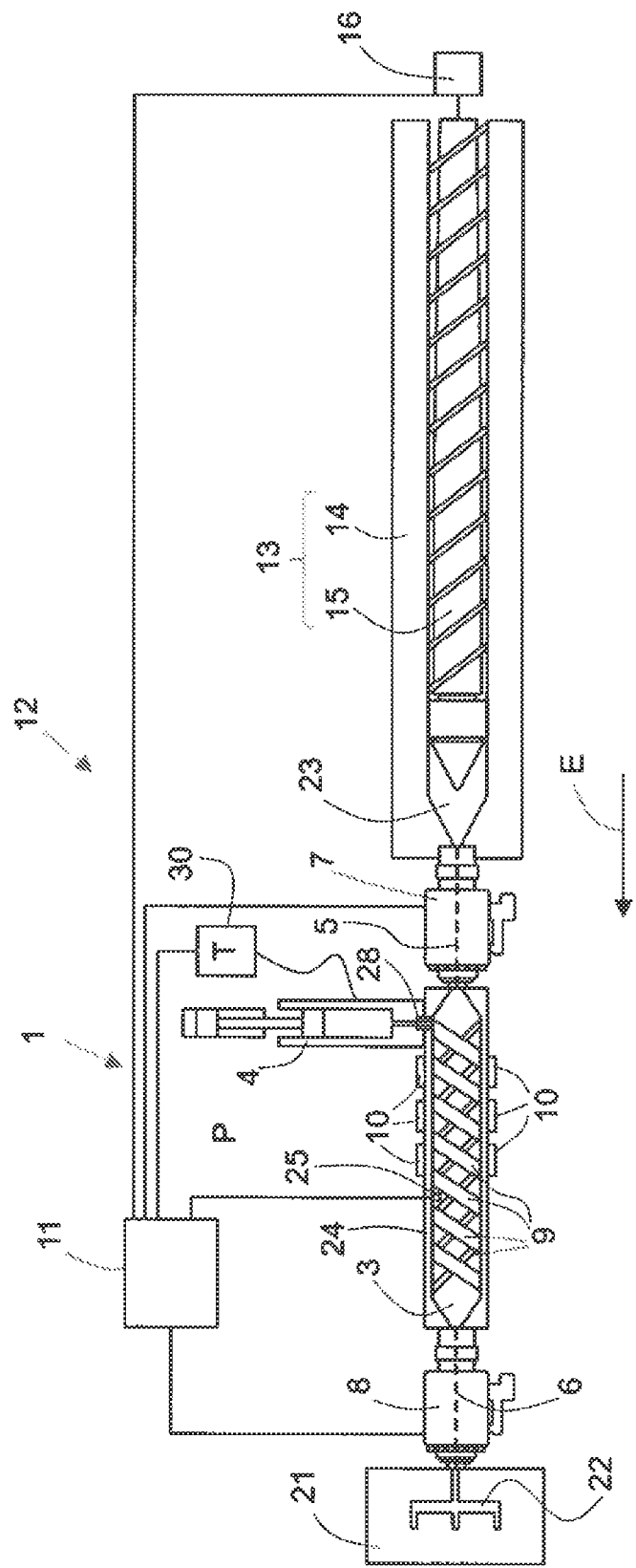

FIG. 7 shows for the most part the same structure as FIG. 2, which is why regarding the contents, it can be referred to the description of FIG. 2. The difference in FIG. 7 is that the propellant inlet device 4 has a piston mechanism or piston injector—precisely a piston-cylinder unit. The inlet valve 28 is retained. In this piston mechanism, the desired amount of propellant is metered under moderate pressure conditions (in the range of 20 bar to keep the piston volume compact) before being pressed into the mixing chamber 3. This allows the advantage that the gas metering can be done very easily, and above all in a reproducible way. The propellant (gas) is then pressed into the melt. With this arrangement, no pressure control is necessary (the piston pressure merely has to be higher than the pressure in the mixing element, which in any case is guaranteed by sufficient hydraulic pressure of the piston). By pressing the entire gas volume into the piston mechanism, very precise metering is above all possible, which does not depend on pressure differences that are difficult to regulate. The injection is carried out as follows:

according to the first process (see also above) while the plastic melt is at rest in the mixing chamber 3. This is the case after injection. The cylinder-sided shutoff device 7 is hereby either already closed, or it may possibly already be metered in parallel.

according to the second process (see also above) during injection of the polymer-gas mixture into the cavity K. For this, the gas pressure in the cylinder of the piston mechanism must be above the injection pressure (up to 2000 bar). This must be ensured by the appropriate design of the piston mechanism of the propellant inlet device 4. The advantage of the second method is the additional axial dispersion of the propellant T.

The advantages of the mixing device according to the invention compared to the so far known gas loading systems are as follows:

The use of an expensive MuCell® aggregate (or other special screw geometries are not required). This means that the plasticizing process can be carried out with conventional 3-zone screws.

Metering problems that occur during gas loading in the cylinder no longer play a role.

Downtimes are no longer a problem.

Gas is added at constant pressure conditions according to the first process sequence or by forced pressure conditions according to the second process sequence. Additional advantages of forced gas injection are exact additional metering, no need for pressure measurement or pressure control, and a simple and compact design.

The danger of gas escaping via the inlet is eliminated by the first (cylinder-sided) shutoff device.

The possible creation of a "gas lake" is prevented by the first (cylinder-sided) shutoff device.

It should generally be noted that the mixing chamber 3 is designed in such a way that it can have several shot volumes. During the first process sequence, it should also be noted that the gas can be fed in over the entire height of the mixing chamber 3. For this purpose a perforated mandrel (FIGS. 3, 5 and 6) or several injection points are distributed over the entire circumference (FIG. 4). The shutoff device can be in the form of shut-off nozzles. In particular, shut-off nozzles with pin shut-offs can be used instead of needle shut-offs. This results in a more compact design.

LIST OF REFERENCE SIGNS

1 mixing device
2 molding machine
3 mixing chamber
4 propellant inlet device
5 inlet channel
6 output channel
7 first gas-tight shutoff device
8 second gas-tight shutoff device
9 mixing elements
10 temperature control device
11 control or regulating unit
12 injection device
13 plasticizing aggregate
14 plasticizing cylinder
15 plasticizing screw
16 drive device for the plasticizing screw
17 clamping unit
18 stationary mold mounting plate
19 movable mold mounting plate
20 drive device for the movable mold mounting plate
21 molding tool
22 injection channel
23 screw vestibule
24 mixing cylinder
25 sensor
26 inlet mandrel
27 inlet channel
28 inlet valve
29 inlet holes
30 propellant source
T propellant P pressure
E injection direction
K cavity

The invention claimed is:

1. An injection device for a molding machine, the injection device comprising:
   a mixing device for producing a plastic melt loaded with a propellant, from which a foamed plastic part is producible in the molding machine; and
   a plasticizing aggregate for melting a plastic starting product, for melting plastic and for conveying the plastic melt in an injection direction into an inlet channel of the mixing device,
   wherein the mixing device includes:
   a mixing chamber;
   at least one propellant inlet device for feeding the propellant into the mixing chamber;
   the inlet channel for the plastic melt;
   an output channel for dispensing the plastic melt loaded with the propellant;
   a first gas-tight shutoff device configured to close the inlet channel such that gas does not exit the mixing chamber through the inlet channel; and
   a second gas-tight shutoff device configured to close the output channel such that gas does not exit the mixing chamber through the output channel,
   wherein:
   the at least one propellant inlet device comprises a piston injector for forced injection;
   the plasticizing aggregate has a plasticizing cylinder, a rotatable plasticizing screw, and a drive device for the rotatable plasticizing screw;
   the rotatable plasticizing screw is rotatable and linearly displaceable; and
   the first gas-tight shutoff device is arranged between the rotatable plasticizing screw and the mixing chamber.

2. The injection device according to claim 1, wherein:
   the mixing chamber has a static mixer; and
   the static mixer is defined by a plurality of stationary mixing elements mounted on a wall of the mixing chamber.

3. The injection device according to claim 1, further comprising a temperature control device for the mixing chamber.

4. The injection device according to claim 1, wherein the propellant is a gas.

5. The injection device according to claim 1, further comprising a control or regulating unit for controlling or regulating the mixing device.

6. The injection device according to claim 5, wherein at least one of the first gas-tight shutoff device or the second gas-tight shutoff device is switchable between a closed position and an open position by the control or regulating unit.

7. The injection device according to claim 5, wherein the at least one propellant inlet device is controllable by the control or regulating unit.

8. A molding machine for producing a foamed plastic part, the molding machine comprising the injection device according to claim 1.

9. The molding machine according to claim 8, further comprising a clamping unit, wherein the clamping unit comprises a stationary mold mounting plate, a movable mold mounting plate, a drive device for the movable mold mounting plate, and a molding tool clamped to the stationary mold mounting plate and the movable mold mounting plate.

10. The molding machine according to claim 9, wherein the second gas-tight shutoff device is defined by at least one shut-off nozzle of the molding tool.

11. The injection device according to claim 3, wherein the temperature control device at least partially surrounds the mixing chamber.

12. The injection device according to claim 4, wherein the gas is nitrogen.

13. The injection device according to claim 6, wherein the at least one of the first gas-tight shutoff device or the second gas-tight shutoff device is switchable between the closed position and the open position by the control or regulating unit depending on a pressure measured in the mixing chamber.

14. The injection device according to claim 1, wherein the plastic starting product is in granular form.

15. An injection device for a molding machine, the injection device comprising:
   a mixing device for producing a plastic melt loaded with a propellant, from which a foamed plastic part is producible in the molding machine; and
   a plasticizing aggregate for melting a plastic starting product, for melting plastic and for conveying the plastic melt in an injection direction into an inlet channel of the mixing device,
   wherein the mixing device includes:
   a mixing chamber;
   at least one propellant inlet device for feeding the propellant into the mixing chamber;
   the inlet channel for the plastic melt;
   an output channel for dispensing the plastic melt loaded with the propellant;
   a first gas-tight shutoff device configured to close the inlet channel such that gas does not exit the mixing chamber through the inlet channel; and
   a second gas-tight shutoff device configured to close the output channel such that gas does not exit the mixing chamber through the output channel,
   wherein:
   the at least one propellant inlet device comprises a piston injector for forced injection;
   the second gas-tight shutoff device, the output channel, the mixing chamber, the inlet channel, the first gas-tight shutoff device and the plasticizing aggregate are arranged along a longitudinal axis;
   the mixing chamber has an elongated shape with longitudinal walls that are parallel to the longitudinal axis; and
   the first gas-tight shutoff device is arranged between the plasticizing aggregate and the mixing chamber.

16. The injection device according to claim 15, wherein the plasticizing aggregate has a plasticizing cylinder, a rotatable plasticizing screw, and a drive device for the rotatable plasticizing screw.

17. The injection device according to claim 16, wherein the plasticizing cylinder, the rotatable plasticizing screw, and the drive device for the rotatable plasticizing screw are arranged along the longitudinal axis.

18. An injection device for a molding machine, the injection device comprising:
   a mixing device for producing a plastic melt loaded with a propellant, from which a foamed plastic part is producible in the molding machine; and
   a plasticizing aggregate for melting a plastic starting product, for melting plastic and for conveying the plastic melt in an injection direction into an inlet channel of the mixing device, wherein the mixing device includes:
a mixing chamber;
at least one propellant inlet device for feeding the propellant into the mixing chamber;
the inlet channel for the plastic melt;
an output channel for dispensing the plastic melt loaded with the propellant;
a first gas-tight shutoff device configured to close the inlet channel such that gas does not exit the mixing chamber through the inlet channel; and
a second gas-tight shutoff device configured to close the output channel such that gas does not exit the mixing chamber through the output channel,
wherein:
the at least one propellant inlet device comprises a piston injector for forced injection;
the mixing chamber has a static mixer defined by a plurality of stationary mixing elements mounted on a wall of the mixing chamber, the plurality of stationary mixing elements being oblique with respect to a longitudinal axis of the mixing chamber; and
the first gas-tight shutoff device is arranged between the plasticizing aggregate and the mixing chamber.

19. The injection device according to claim 18, wherein the plasticizing aggregate has a plasticizing cylinder, a rotatable plasticizing screw, and a drive device for the rotatable plasticizing screw.

\* \* \* \* \*